United States Patent
Kay et al.

(10) Patent No.: US 9,835,417 B1
(45) Date of Patent: Dec. 5, 2017

(54) RPG SHIELD NETTING AND RELATED MANUFACTURING METHODS

(71) Applicants: Ronald J. Kay, Naples, FL (US); Robert Durkee, Austin, TX (US)

(72) Inventors: Ronald J. Kay, Naples, FL (US); Robert Durkee, Austin, TX (US)

(*) Notice: Subject to any disclaimer, the term of this patent is extended or adjusted under 35 U.S.C. 154(b) by 0 days.

(21) Appl. No.: 14/944,834

(22) Filed: Nov. 18, 2015

Related U.S. Application Data (60) Provisional application No. 62/081,369, filed on Nov. 18, 2014.

(51) Int. Cl.
| | |
|---|---|
| *F41H 5/02* | (2006.01) |
| *F41H 11/05* | (2006.01) |
| *B29D 28/00* | (2006.01) |
| *F41H 7/04* | (2006.01) |
| *B29K 101/12* | (2006.01) |

(52) U.S. Cl.
CPC ........... *F41H 5/026* (2013.01); *B29D 28/005* (2013.01); *F41H 7/04* (2013.01); *B29K 2101/12* (2013.01); *B29K 2995/0005* (2013.01); *B29K 2995/0008* (2013.01); *B29K 2995/0089* (2013.01); *B29K 2995/0094* (2013.01)

(58) Field of Classification Search
CPC ........ F41H 5/026; F41H 5/023; F41H 5/0492; F41H 11/05; B63G 9/04; B29C 70/125; B29C 70/224; B29C 70/222; B29C 70/226; B29C 70/228; B29C 70/68; B29C 70/687; B29C 70/688
See application file for complete search history.

(56) References Cited

U.S. PATENT DOCUMENTS

| | | | | |
|---|---|---|---|---|
| 461,983 | A | 10/1891 | Parker | |
| 1,055,489 | A | 3/1913 | Pendery | |
| 1,204,547 | A * | 11/1916 | Corrado et al. | F41H 11/05 114/240 B |
| 1,240,317 | A * | 9/1917 | Clark | F41H 11/05 114/240 C |
| 2,102,746 | A * | 12/1937 | Reilly | B44C 1/10 29/10 |
| 2,308,683 | A * | 1/1943 | Forbes | F41H 11/04 102/504 |
| 2,920,354 | A * | 1/1960 | Zumbrunnen | B29C 45/14565 264/251 |
| 3,129,632 | A | 4/1964 | Starr | |
| 3,298,402 | A * | 1/1967 | Hale | B21F 27/20 140/112 |
| 3,501,366 | A * | 3/1970 | Bramley | A01K 3/00 156/181 |
| 3,591,215 | A * | 7/1971 | Frost | B29C 45/14581 264/251 |

(Continued)

FOREIGN PATENT DOCUMENTS

| | | |
|---|---|---|
| WO | 2013043216 | 3/2013 |
| WO | 2017014819 | 1/2017 |

*Primary Examiner* — Derrick R Morgan
(74) *Attorney, Agent, or Firm* — Valauskas Corder LLC (57) ABSTRACT

An improved RPG shield netting that comprises a net structure supporting a spaced arrangement of one-piece nodes manufactured using an insert injection molding process such that each node is formed as a one-piece three-dimensional solid shape with uniform surfaces that envelopes a portion of one or more cord elements.

26 Claims, 5 Drawing Sheets

(56) References Cited

U.S. PATENT DOCUMENTS

| | | | |
|---|---|---|---|
| 3,608,034 A * | 9/1971 | Bramley | A01K 3/005 264/145 |
| 3,950,584 A * | 4/1976 | Bramley | B29C 45/14581 156/167 |
| 3,950,829 A | 4/1976 | Cohen | |
| 3,983,280 A * | 9/1976 | Bramley | A01K 71/00 156/181 |
| 4,201,814 A * | 5/1980 | Gilbert | D04H 3/04 428/107 |
| 4,399,430 A * | 8/1983 | Kitchen | G02B 6/4469 250/227.15 |
| 4,536,429 A * | 8/1985 | Mercer | B29D 28/00 264/288.4 |
| 4,688,024 A * | 8/1987 | Gadde | F41H 11/05 256/1 |
| 4,945,694 A * | 8/1990 | Mitchell | B28B 23/00 52/223.1 |
| 5,039,159 A | 8/1991 | Bonner | |
| 5,069,109 A * | 12/1991 | Lavan, Jr. | B63G 9/04 114/240 C |
| 5,142,809 A | 9/1992 | O'Brien | |
| 5,179,244 A | 1/1993 | Zufle | |
| 5,188,040 A | 2/1993 | Doring | |
| 5,197,239 A | 3/1993 | Glynn et al. | |
| 5,269,623 A | 12/1993 | Hanson | |
| 5,370,035 A | 12/1994 | Madden | |
| 5,441,239 A | 8/1995 | Watson | |
| 5,524,524 A * | 6/1996 | Richards | F21S 2/00 102/310 |
| 5,527,500 A * | 6/1996 | Specht | B29C 45/14336 264/252 |
| 5,595,795 A * | 1/1997 | Alfred | B29C 31/08 156/291 |
| 5,669,590 A | 9/1997 | Przewodek | |
| 5,962,150 A * | 10/1999 | Priluck | B21F 27/02 140/5 |
| 6,112,635 A | 9/2000 | Cohen | |
| 6,386,606 B1 | 5/2002 | Marshall | |
| 7,150,217 B2 | 12/2006 | Kershaw | |
| 7,322,135 B2 | 1/2008 | Gulati | |
| 7,618,572 B2 * | 11/2009 | Coffield | A47C 7/282 264/229 |
| 7,694,621 B1 * | 4/2010 | Ma | F41H 5/0492 89/36.02 |
| 7,866,250 B2 | 1/2011 | Farinella | |
| 7,900,548 B2 | 3/2011 | Hoadley et al. | |
| 8,011,285 B2 | 9/2011 | Farinella | |
| 8,245,620 B2 | 8/2012 | Farinella | |
| 8,245,621 B2 | 8/2012 | Farinella | |
| 8,245,622 B2 | 8/2012 | Farinella | |
| 8,443,709 B2 | 5/2013 | Farinella | |
| 8,453,552 B2 | 6/2013 | Farinella | |
| 8,464,627 B2 | 6/2013 | Farinella | |
| 8,468,927 B2 | 6/2013 | Malone et al. | |
| 8,607,685 B2 | 12/2013 | Farinella | |
| 8,615,851 B2 | 12/2013 | Holmes et al. | |
| 8,677,882 B2 | 3/2014 | Shackelford et al. | |
| 8,733,225 B1 | 5/2014 | Farinella | |
| 8,783,156 B1 | 7/2014 | Malone et al. | |
| 8,813,631 B1 * | 8/2014 | Shackelford | F41H 5/013 89/36.02 |
| 8,910,349 B1 | 12/2014 | Holmes et al. | |
| 9,052,167 B2 | 6/2015 | Farinella | |
| 9,328,999 B1 * | 5/2016 | Kay | F41H 5/06 |
| 9,435,615 B1 * | 9/2016 | Kay | F41H 5/026 |
| 2003/0140936 A1 * | 7/2003 | Yuhara | A45D 33/003 132/307 |
| 2004/0212217 A1 | 10/2004 | Caccuci | |
| 2005/0064149 A1 * | 3/2005 | Iseki | A47C 7/282 428/192 |
| 2005/0132873 A1 | 6/2005 | Diaz Supisiche | |
| 2007/0089597 A1 * | 4/2007 | Ma | F41H 5/0492 89/36.02 |
| 2007/0180983 A1 | 8/2007 | Farinella | |
| 2008/0164379 A1 * | 7/2008 | Wartmann | F41H 5/013 245/8 |
| 2008/0231067 A1 | 9/2008 | Nagle | |
| 2008/0314237 A1 | 12/2008 | Cioffi | |
| 2009/0205166 A1 | 8/2009 | Murray | |
| 2009/0217811 A1 * | 9/2009 | Leeming | F41H 5/023 89/36.02 |
| 2009/0266227 A1 | 10/2009 | Farinella | |
| 2010/0224055 A1 | 9/2010 | Soukos | |
| 2010/0288114 A1 * | 11/2010 | Soukos | F41H 5/026 89/36.02 |
| 2010/0294122 A1 | 11/2010 | Hoadley et al. | |
| 2010/0294124 A1 | 11/2010 | Wentzel | |
| 2010/0319524 A1 | 12/2010 | Farinella | |
| 2011/0079135 A1 * | 4/2011 | Farinella | F41H 5/013 89/36.02 |
| 2011/0168001 A1 | 7/2011 | Lee | |
| 2011/0168003 A1 | 7/2011 | Kim | |
| 2011/0179944 A1 | 7/2011 | Farinella | |
| 2011/0192014 A1 | 8/2011 | Holmes et al. | |
| 2011/0232470 A1 | 9/2011 | Cioffi | |
| 2012/0011993 A1 | 1/2012 | Malone et al. | |
| 2012/0011994 A1 | 1/2012 | Hoadley et al. | |
| 2012/0046916 A1 | 2/2012 | Farinella | |
| 2012/0096703 A1 * | 4/2012 | Zachau | B32B 7/005 29/592 |
| 2013/0025441 A1 * | 1/2013 | Lee | F41H 5/026 89/36.02 |
| 2013/0032026 A1 * | 2/2013 | Shackelford | F41H 5/013 89/36.02 |
| 2013/0226237 A1 | 8/2013 | Stanley | |
| 2014/0013934 A1 | 1/2014 | Inglefield | |
| 2014/0261109 A1 * | 9/2014 | Mitchell | F42D 5/045 109/58.5 |
| 2015/0033935 A1 | 2/2015 | Boyer | |
| 2015/0253114 A1 * | 9/2015 | Neal | F41H 5/0421 89/36.02 |

\* cited by examiner

RPG SHIELD NETTING AND RELATED MANUFACTURING METHODS

CROSS-REFERENCE TO RELATED APPLICATIONS

This application claims priority to U.S. Provisional Patent Application No. 62/081,369 filed Nov. 18, 2014, which is incorporated herein by reference.

FIELD OF THE INVENTION

The present invention generally relates to products manufactured using insert injection molding techniques. More particularly, the invention relates to shield netting such as those used as defense systems in military operations, for example shield netting for protecting vehicles or other assets from a rocket propelled grenade (RPG) attack (i.e., RPG netting).

BACKGROUND OF THE INVENTION

A rocket-propelled grenade ("RPG") is generally a weapon system comprised of a rocket having an explosive warhead. Certain RPGs are designed to be portable so that it may be easily carried and shoulder-fired by a person. These features combined with low production cost make the RPG a weapon seen frequently in conflicts throughout the world.

Various static systems for defending against RPG attacks have been designed that include, for example, steel grilles, bar/slat, and chain link. All of these systems suffer from various deficiencies including limited effectiveness as well as excessive weight, cost, installation time, manual assembly and difficulty of repair.

One such system can be seen at U.S. Pat. No. 9,052,167 to Farinella et al. According to the RPG shield of Farinella, netting supports a spaced array of hard points. Each hard point is constructed of a base portion including a cavity for receiving a post or plug. The netting is hand assembled by positioning and aligning the netting element within the cavity of the base portion and forcing the plug into the cavity to secure the netting in place. Optimally configured, the hard points are designed to dig into the nose cone of an RPG and dud it while the netting is compliant to prevent the RPG from detonating.

While the prior art fulfills its respective particular objectives and requirements, the manufacturing process is expensive and complicated requiring separately machined parts and assembly of two-piece hard points.

A need remains for an improved RPG shield netting and methods of manufacture that simplifies assembly processes, reduces costs, and improves effectiveness. The present invention satisfies this need.

SUMMARY OF THE INVENTION

The present invention is directed to an improved RPG shield netting that comprises a net structure supporting a spaced arrangement of one-piece nodes manufactured using an automated assembly process. More specifically, the RPG shield netting according to the invention is manufactured using an insert injection molding process.

According to the invention, the net structure includes cord elements that are each inserted or placed into the channel components of the mold cavity. The net structure may be flexible and includes a plurality of cord elements that are intertwined in any contemplated arrangement. Nodes are formed using an injection molding process. Injection molding is a manufacturing process for making objects by injecting materials at high pressure into a mold base shaped as the inverse of the desired shape of the object. Each node is formed as a one-piece three-dimensional solid shape with uniform (or non-uniform) surfaces that envelopes a portion of one or more cord elements.

Any size and shape RPG shield netting is contemplated, for example, a rectangular shape with a size defined by a length and width. In certain embodiments, any size shield netting may be accomplished by feeding or advancing, in an automated fashion, the cord elements of the net structure for placement within the channel components of the mold after each mold cycle. For example, a net structure that includes horizontally and vertically configured cord elements may use a process that automatically advances horizontally configured cord elements simultaneously with vertically configured core elements into the molding machine.

As known to those skilled in the art, the features of both the net structure and nodes are critical in the design of the RPG shield netting. Features of the net structure include the aspect ratio (proportion between width and height) of each piece of shield netting, material properties of the cord elements, and arrangement of intertwined cord elements (i.e., triangular mesh, square mesh). Features of the node elements include position (spacing between one another) and configuration directed to size, shape, weight, density of the nodes. Other features of the node elements that may be optimized to improve effectiveness may include hardness, radiation shielding, corrosion resistance, electrical conductivity, and certain magnetic properties. According to the invention, the features of the nodes and netting can be easily changeable. For example, different materials may be used to form the node elements including a combination of specific materials to achieve a desired weight or density, such as Ecomass® compounds, a line of nontoxic high density composite materials. As another example, spacing between nodes can be manipulated to any distance and nodes may be injection molded to any size and shape.

The net structure of the shield netting comprises a plurality of cord elements constructed from any contemplated material including a flexible or rigid material. The net structure of the shield netting may also be any contemplated aspect ratio, which may depend on the application. As an example, the RPG shield netting may be of an aspect ratio that fully covers a structure such as a military vehicle. As another example, the RPG shield may be of an aspect ratio that partially covers the entrance of a building structure.

The position or spacing between nodes may be any contemplated value, again depending on the application. For example, placement of one-piece nodes may appear in a pattern or non-recurring design with any contemplated spacing between nodes. However, a spacing of nodes is desired such that the RPG is deactivated or prevented from detonating, also known as duding.

Any configuration of the nodes is contemplated. For example, the nodes may be large or small in size and may further be any three-dimensional solid shape such as a polyhedron. A polyhedron is a solid in three dimensions with flat polygonal faces, straight edges and sharp corners or vertices. Polyhedrons include, for example, cube, prism (triangular, square, rectangular, hexagonal), pyramid (triangular, square, rectangular, hexagonal). Other three-dimensional solid shapes are also contemplated such as conical, cylindrical and spherical. Using an insert injection molding process according to the invention allows the nodes to be constructed of any material. Therefore, in addition to position and configuration of the nodes, material properties of the nodes may be customizable thereby providing improved effectiveness to deactivate or dud the RPG. Based on the material selected, density, hardness, radiation shielding, corrosion resistance and conductivity can be optimized to improve effectiveness of the node. For example, a lighter weight node may prove to be more effective than a heavier weight node. As another example, a high-gravity compound may be used to construct the node.

Using an insert injection molding process imparts distinctive structural characteristics to the nodes and RPG shield netting including the formation of a one-piece three-dimensional solid shape node with one or more uniform surfaces as well as the manufacture of an arrangement of intertwined cord elements (i.e., triangular mesh, square mesh) that provides improvement over the prior art. Another distinctive structural characteristic of the nodes according to the invention is that each node envelopes or completely surrounds a portion of the netting.

The present invention advantageously eliminates hand assembly and decreases manufacturing time and cost. In addition, the present invention increases manufactured output such as a lighter more effective RPG shield netting making it easy to install and remove such as used with structures such as a vehicle, a building, infrastructure such as bridges, or any other asset.

The invention and its attributes and advantages will be further understood and appreciated with reference to the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

The present invention is directed to an improved RPG shield netting that comprises a net structure supporting a spaced arrangement of one-piece nodes manufactured using an insert injection molding process.

Figure 1:
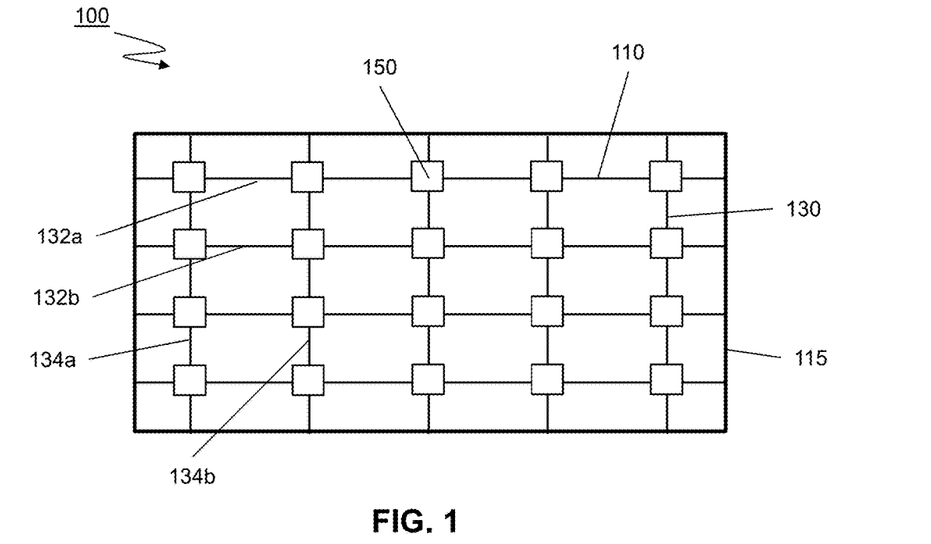
FIG. 1 illustrates a top view of a portion of RPG shield netting according to one embodiment of the invention.

FIG. 1 illustrates a top view of a portion of RPG shield netting 100 according to one embodiment of the invention. The RPG shield netting 100 comprises a flexible net structure 110 including a plurality of cord elements 130. As generally shown in FIG. 1, cord elements may be horizontally and vertically configured such as the cord elements shown by 132a, 132b and 134a, 134b, respectively. The RPG shield netting 100 further comprises one or more node elements 150, shown as cubical. Each node element 150 comprises a one-piece three-dimensional solid shape with uniform surfaces that envelopes a portion of one or more cord elements 130. As shown in FIG. 1, the RPG shield netting 100 may include finished ends such as that achieved with a frame element 115.

Frame element 115 may be positioned around a perimeter of the RPG shield netting 100 to assist in securing or attaching the RPG shield netting to a structure as well as used to achieve a desired size and shape such as a rectangular shape with a size defined by a length and width. One feature of the net structure is directed to the aspect ratio or proportion between a width and a height of each piece of shield netting. Any aspect ratio is contemplated as dependent upon the application of use. For example, according to one embodiment of the invention, the RPG shield netting may be manufactured to a length up to and including 100 feet (30.5 m) and a width up to and including 4 feet (1.2 m).

Figure 2:
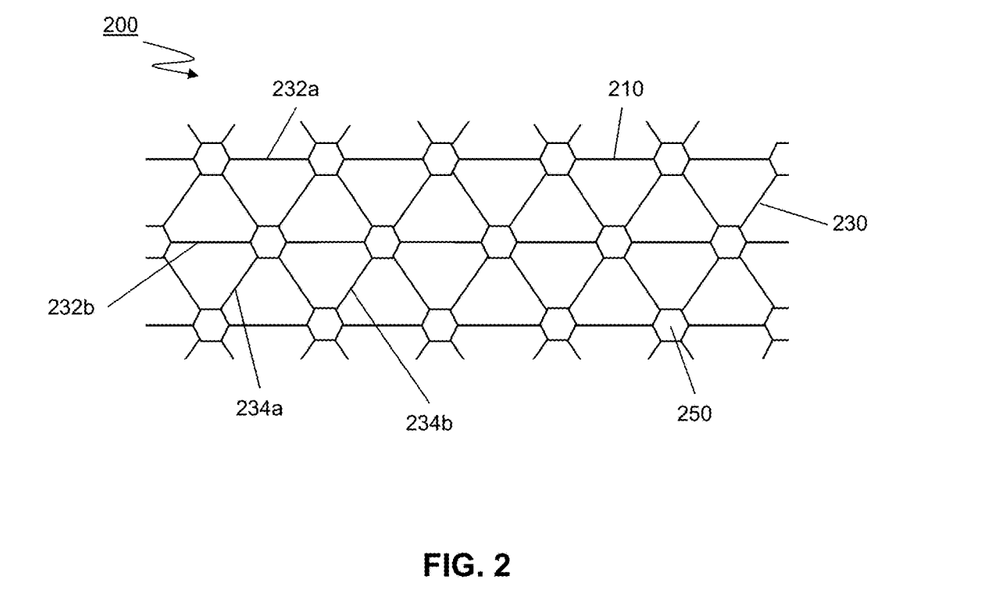
FIG. 2 illustrates a top view of a portion of RPG shield netting according to another embodiment of the invention.

FIG. 2 illustrates a top view of a portion of RPG shield netting 200 according to another embodiment of the invention. As shown in FIG. 2, the RPG shield netting 200 includes un-finished ends. Un-finished ends may be used to assist in securing or attaching the RPG shield netting to a structure or may be used to attach one piece of RPG shield netting to another piece of shield netting such as by crimping, welding, clamping, etc. The RPG shield netting 200 comprises a flexible net structure 210 including a plurality of cord elements 230. As generally shown in FIG. 2, cord elements may be horizontally and diagonally configured such as the cord elements shown by 232a, 232b and 234a, 234b, respectively. The RPG shield netting 200 further comprises one or more node elements 250 with each node element 250 comprising a one-piece three-dimensional solid shape with uniform surfaces that envelopes a portion of one or more cord elements 230. According to FIG. 2, the node elements are shown as polyhedrons.

The net structure of the shield netting comprises a plurality of cord elements constructed from any contemplated material including a flexible or rigid material. According to the present invention, the cord elements comprising the flexible net structure may be constructed from an elastomeric material, synthetic materials such as aramid fibers of high tensile strength, for example Kevlar®.

In addition to the material properties, another feature of the net structure is directed to the arrangement of intertwined cord elements including spacing of cord elements and/or node elements from one another. For example, cord elements may be spaced apart from one another between and including 4.3 inches to 7.1 inches (110 to 180 mm). By virtue of this spacing, node elements are also located between and including 4.3 inches to 7.1 inches (110 to 180 mm) apart from one another, although any spacing is contemplated. Intertwined cord elements create a mesh with endless arrangements including, for example, a square mesh as shown in FIG. 1 or a triangular mesh as shown in FIG. 2.

As shown in FIG. 1 and FIG. 2, the position or spacing between nodes 150, 250 may be any contemplated value depending on the application of use. For example, placement of one-piece nodes may appear in a pattern or non-recurring design with any contemplated spacing between nodes provided the spacing between nodes may deactivate a RPG or prevent it from detonating.

Figure 3:
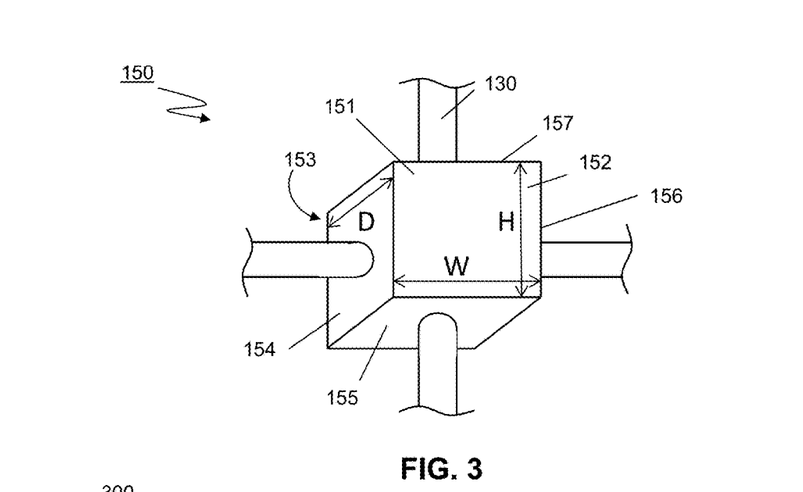
FIG. 3 is an enlarged perspective view of a node including net structure according to one embodiment of the invention.

FIG. 3 is an enlarged perspective view of a particular node element 150 as previously illustrated in FIG. 1. As shown, the node element 150 is a three-dimensional solid shape polyhedron with flat polygonal faces, straight edges and sharp corners or vertices. Specifically, node element 150 is shown as a small cube 151 with a front face 152, rear face 153 and four side faces 154, 155, 156, 157; however, any configuration of the node is contemplated. For example, node elements may be large or small in size as defined by a width ("W"), a height ("H") and a depth ("D"). According to one embodiment of the invention, the node element has a width between and including 0.5 to 0.75 inches (12.7 to 19.1 mm) and a height between and including 0.5 and 1.0 inches (12.7 to 25.4 mm).

Although the front face 152 and rear face 153 of each node element 150 is shown as the same design (i.e., square planar surface), the front face 152 and rear face 153 may be different from one another, if desired.

In addition, the node element may be any three-dimensional solid shape such as a triangular prism, square prism, rectangular prism, hexagonal prism, triangular pyramid, square pyramid, rectangular pyramid, hexagonal pyramid, or any other three-dimensional solid shape such as conical, cylindrical and spherical.

The node elements may also be constructed of a material to achieve desired properties including hardness, weight, density, etc. According to the present invention, node elements may be constructed from a resin material, additives such as conductive or radiation resistant additive, fillers or any combination thereof. Resin materials may include polymeric base resin materials such as a thermoplastic base resin. Examples of thermoplastic base resin materials include polyethylene, polypropylene, polyamide, polyphthalamide, and polyphenylene sulfide, to name a few; however any thermoplastic base resins known to those skilled in the art may be used.

Each node element may further include a conductive material or magnetic material such as a magnetic powder. Magnetic powders include, for example, barium ferrite, strontium ferrite, or neodymium iron boron. Each node element may also include a material that resists corrosion such as stainless steel, tungsten, or zinc. Conductive additive materials may include, for example, conductive fibers, conductive powders such as carbon fiber, carbon powder, stainless steel fiber, nickel-coated graphite fiber, copper powder, tungsten, copper fiber, titanium, steel powder, iron powder, and/or other metallic fibers and powders. As an example, desired conductivity according to the invention may be in the range of 1.101 to $1\times10^6$ ohms per square ($\Omega$/sq).

As another example, high-gravity compound materials may be used to construct the node element such as compounds that can be formulated to achieve a desired density such as including between 2 grams per cubic centimeter (g/cc) up to 11 g/cc. High-gravity compounds, such as Ecomass® compounds, may be formulated from a variety of polymers as well as fillers such as copper, tungsten, stainless steel and barium sulfate.

Any combination of resin materials, including additives or fillers, may also be used to achieve a desired relatively high hardness value in the range of Shore D 70 to Shore D 90. Furthermore, a desired weight may be achieved through selection of materials, for example a weight ranging between and including 0.35 oz. and 1.41 oz. (10 to 40 grams), although any effective weight is contemplated.

An advantage of the invention is that features such as size, shape, weight, density, hardness, radiation shielding, corrosion resistance and conductivity can be adjusted to achieve the optimum effectiveness of the node element such that the RPG shield netting prevents the destruction of or damage to the protected asset from an RPG.

Figure 4A:
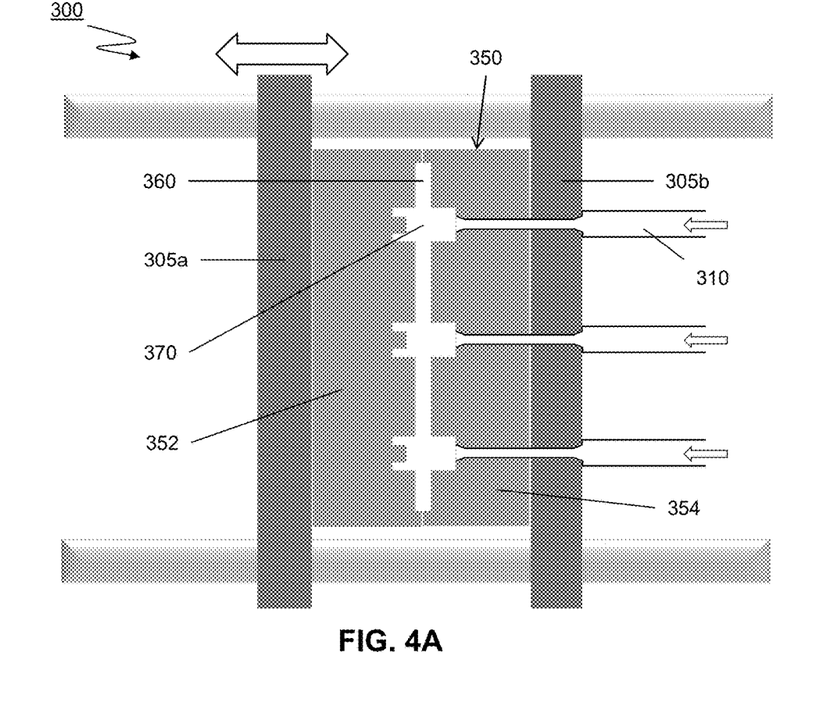
FIG. 4A illustrates a side view of a contemplated insert injection molding machine including mold base used to manufacture RPG shield netting according to one embodiment of the invention.

FIG. 4A illustrates a side view of a contemplated insert injection molding machine 300 including mold base 350 used to manufacture RPG shield netting according to one embodiment of the invention. The insert injection molding machine 300 includes platens 305a, 305b to which the mold base 350 is attached. The mold base 350 includes a core portion 352 and a cavity portion 354. The mold base 350 includes one or more channel components 360 and one or more chamber components 370. The channel components 360 are configured to receive the cord elements of the net structure prior to the injection of material (shown by 310) into the chambers to form the node elements. As can be seen in FIG. 4A, the node element is injection molded such that it is formed as a one-piece three-dimensional solid shape with uniform surfaces that envelopes a portion of one or more cord elements.

Figure 4B:
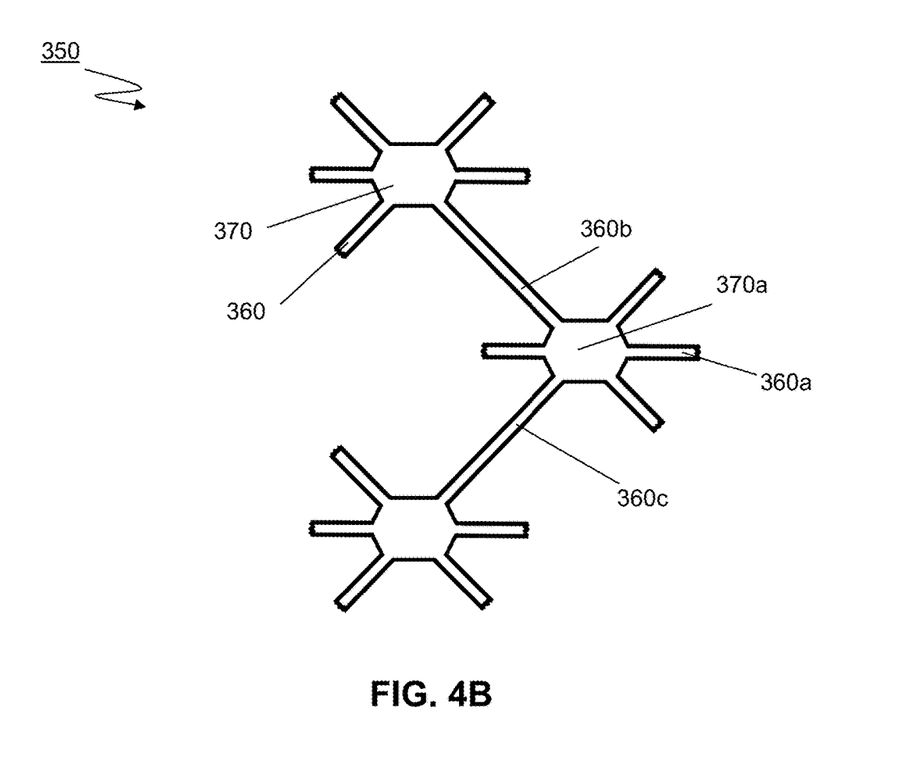
FIG. 4B illustrates a top view of a portion of the mold base comprising channel components and chamber components according to one embodiment of the invention.

FIG. 4B illustrates a top view of a portion of the mold base 350 shown in FIG. 4A. The mold base 350 includes channel components 360 and chamber components 370. Horizontal channel component 360a and diagonal channel components 360b, 360c are joined by chamber component 370a. Cord elements are placed in each channel component 360 of the mold base 350. Material is injection molded into each chamber component 370 to envelope a portion of the cord elements forming a triangular mesh (see FIG. 2).

Figure 5A:
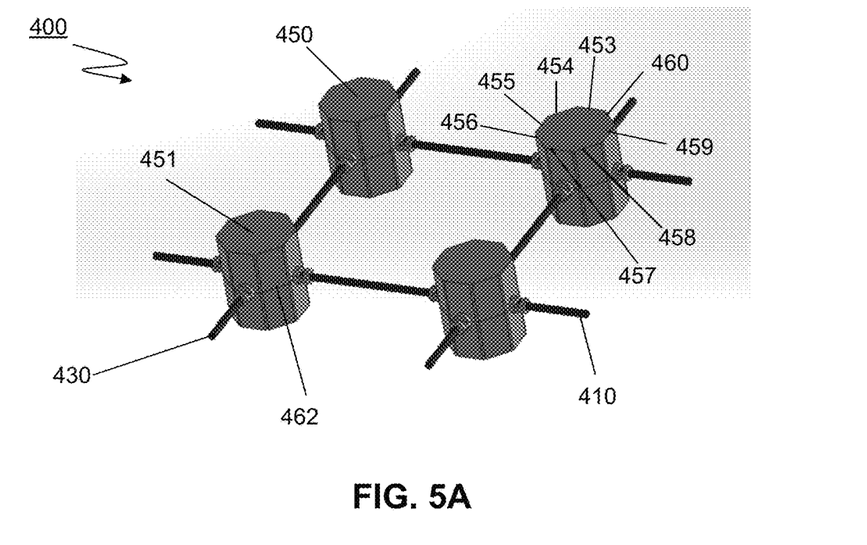
FIG. 5A illustrates a perspective view of RPG shield netting manufactured from the mold base of FIG. 5 according to an embodiment of the invention.
Figure 5B:
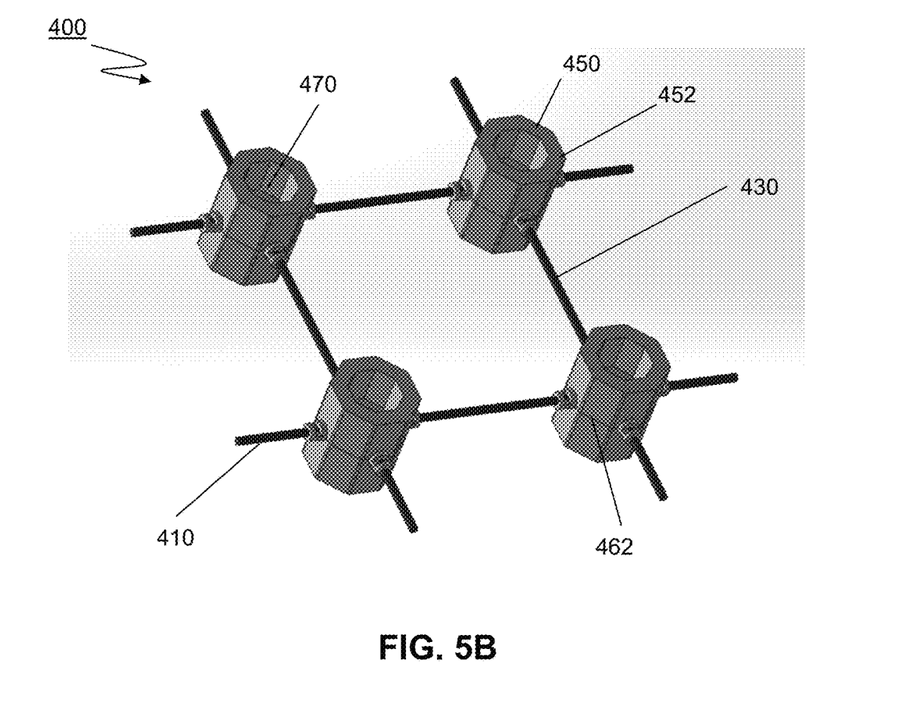
FIG. 5B illustrates an alternate perspective view of RPG shield netting of FIG. 5A according to an embodiment of the invention.

FIG. 5A and FIG. 5B illustrate perspective views of RPG shield netting 400 manufactured from the mold base according to an embodiment of the invention.

The RPG shield netting 400 comprises a flexible net structure 410 including a plurality of cord elements 430, shown in FIGS. 5A and 5B as horizontally and vertically configured. The RPG shield netting 400 further comprises one or more node elements 450, shown as hexagonal prism. Each node element 450 comprises a one-piece three-dimensional solid shape with both uniform and non-uniform surfaces that envelopes a portion of one or more cord elements 430.

More specifically, each hexagonal prism node element 450 includes a front face 451, rear face 452 and eights side faces 453, 454, 455, 456, 457, 458, 459, 460. As shown in FIG. 5B, all surfaces of the node element 250 are uniform with the exception of rear face 452. The rear face 452 includes a non-uniform surface by virtue of a core-out portion 470. The core-out portion 470 may be implemented to reduce the amount of material used to form the one-piece node, for example to meet material weight requirements, as well as assist with removing the RPG shield netting from the molding machine. As shown in FIGS. 5A and 5B, each node 450 is formed as a one-piece three-dimensional solid shape that envelopes a portion of one or more cord elements. It should be noted that element 462 denotes a parting line created at the point where the core portion and cavity portion of the mold base meet.

Figure 6:
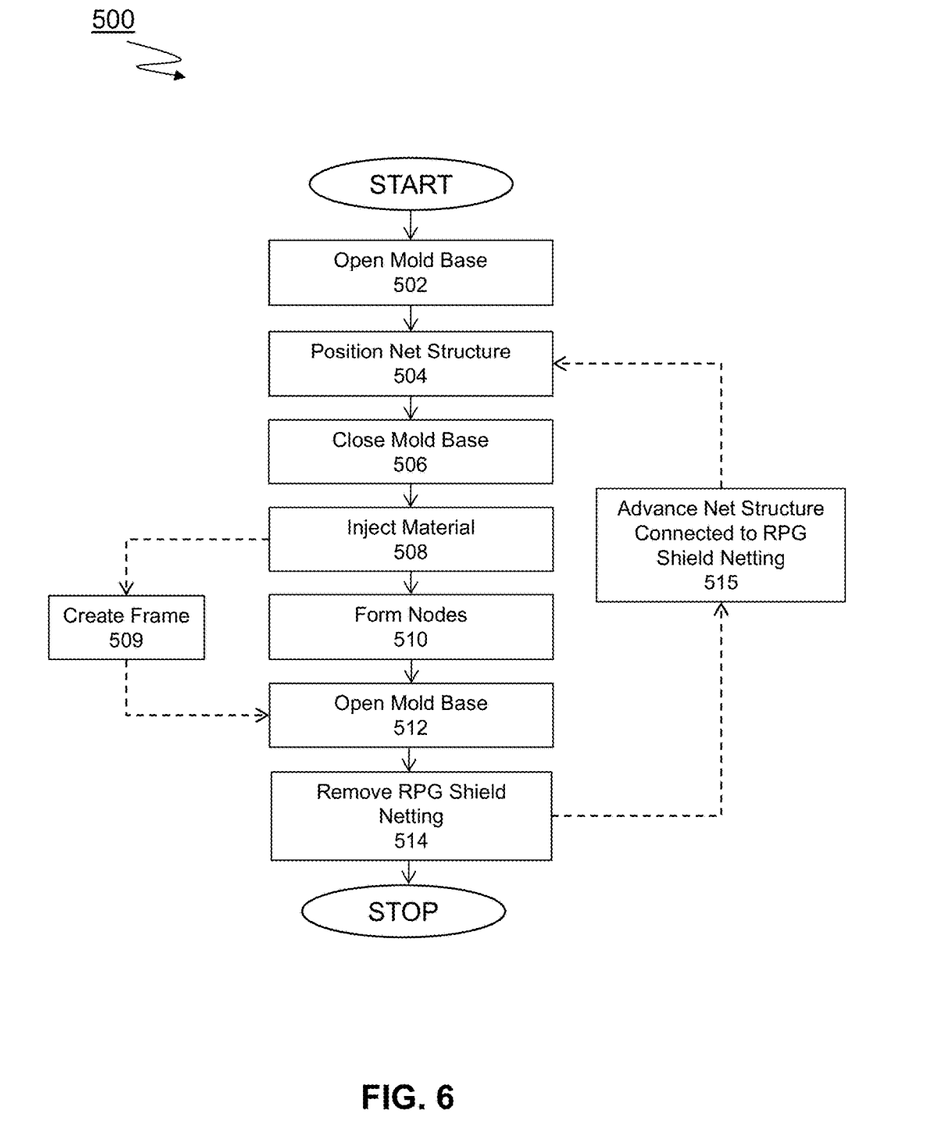
FIG. 6 illustrates a flow chart according to certain steps associated with a method of manufacture according to one embodiment of the invention.

FIG. 6 illustrates a flow chart 500 of a mold cycle according to certain steps for manufacturing RPG shield netting according to one embodiment of the invention. At step 502 a mold base is opened exposing the mold cavity, wherein the mold cavity includes one or more channel components and one or more chamber components. At step 504 the net structure is positioned within the mold cavity. Specifically, the one or more cord elements of the net structure are each placed in a channel component. At step 506, the core portion and cavity portion of the mold base are closed. The selected material is injected into the mold base at step 508. The material is injected into the mold base such that the chamber components fill with material and form a one-piece three-dimensional solid shape node elements with uniform surfaces that envelopes a portion of one or more cord elements at step 510. In addition to forming node elements, an alternative embodiment may create a frame element at step 509. At step 512, the mold base is opened and the RPG shield netting is removed at step 514. In an alternate embodiment of the invention, net structure connected to the RPG shield netting that was removed is advanced automatically at step 515 for the next mold cycle to create a continuous RPG shield netting of any length and width.

While this disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for manufacturing RPG shield netting, the method comprising the steps of:
   (a) opening a mold base exposing a mold cavity, wherein the mold cavity includes two or more rows and two or more columns of channel components and two or more rows and two or more columns of chamber components, each chamber component positioned at an intersection of channel components;
   (b) positioning cord elements within each channel component creating a net structure within the channel components of the mold cavity;
   (c) closing the mold base;
   (d) injecting a selected material into each chamber component of the mold base;
   (e) forming within each chamber component a one-piece three-dimensional solid shape node element;
   (f) constructing a mesh of both the net structure and node elements each positioned at an intersection of cord elements, wherein the mesh comprises two or more rows and two or more columns of channel components and two or more rows and two or more columns of chamber components;
   (g) opening the mold base; and
   (h) removing the mesh from the mold base.

2. The method for manufacturing RPG shield netting according to claim 1, wherein the injecting step further comprises the step of creating a frame element around a perimeter of the mesh.

3. The method for manufacturing RPG shield netting according to claim 1 wherein the positioning step further comprises the step of simultaneously advancing automatically all cord elements within each channel component after step (g) to create a continuous net structure of any length and width.

4. The method for manufacturing RPG shield netting according to claim 1, wherein the node element comprises a composite material.

5. The method for manufacturing RPG shield netting according to claim 4, wherein the composite material is a high density composite material.

6. The method for manufacturing RPG shield netting according to claim 1, wherein the node element comprises a conductive material.

7. The method for manufacturing RPG shield netting according to claim 6, wherein the conductive material is one or more comprising a conductive fiber, a conductive powder, a metal fiber, or a metal powder.

8. The method for manufacturing RPG shield netting according to claim 1, wherein the node element comprises a magnetic powder.

9. The method for manufacturing RPG shield netting according to claim 8, wherein the magnetic powder is one or more selected from the group comprising: barium ferrite, strontium ferrite, or neodymium iron boron.

10. The method for manufacturing RPG shield netting according to claim 1, wherein the node element comprises a polymeric base resin material.

11. The method for manufacturing RPG shield netting according to claim 10, wherein the polymeric base resin material is a thermoplastic base resin.

12. The method for manufacturing RPG shield netting according to claim 11, wherein the thermoplastic base resin comprises one or more selected from the group comprising: polyethylene, polypropylene, polyamide, polyphthalamide, and polyphenylene sulfide.

13. The method for manufacturing RPG shield netting according to claim 1, wherein the node element is injection molded in a polyhedron shape.

14. The method for manufacturing RPG shield netting according to claim 1, wherein the node element weighs between and including 0.35 ounces and 1.41 ounces (10 to 40 grams).

15. The method for manufacturing RPG shield netting according to claim 1, wherein a width of the node element is between and including 0.5 to 0.75 inches (12.7 to 19.1 mm) and a height of the node element is between and including 0.5 and 1.0 inches (12.7 to 25.4 mm).

16. The method for manufacturing RPG shield netting according to claim 1, wherein the net structure includes one or more cord elements spaced apart from one another between and including 4.3 inches to 7.1 inches (110 to 180 mm).

17. The method for manufacturing RPG shield netting according to claim 1, wherein a length of the mesh is up to and including 100 feet (30.5 m) and a width the mesh is up to and including 4 feet (1.2 m).

18. The method for manufacturing RPG shield netting according to claim 1, wherein the net structure comprises a synthetic material.

19. The method for manufacturing RPG shield netting according to claim 18, wherein the synthetic material is an aramid fiber.

20. The method for manufacturing RPG shield netting according to claim 1, wherein the mesh is a triangular mesh.

21. A method for manufacturing a RPG shield netting, the method comprising the steps of:
   (a) opening a mold base exposing a mold cavity, wherein the mold cavity comprises two or more rows and two or more columns of chamber components, two or more diagonal channel components, and either two or more vertical channel components or two or more horizontal channel components;
   (b) simultaneously advancing automatically all cord elements into the mold cavity, each cord element positioned within each of the channel components;
   (c) closing the mold base;

(d) injecting a selected material into each chamber component of the mold base;

(e) forming a one-piece three-dimensional solid shape node element within each chamber component;

(f) constructing a mesh of both cord elements and node elements each positioned at an intersection of cord elements, wherein the mesh includes two or more rows and two or more columns of channel components, two or more diagonal channel components, and either two or more vertical channel components or two or more horizontal channel components;

(g) opening the mold base and removing the mesh;

(h) repeating steps (b)-(g) to form a continuous mesh of a desired length and a desired width; and (i) removing the continuous mesh from the mold base.

22. The method for manufacturing RPG shield netting according to claim 21, wherein each channel component is located less than 90 degrees from the other channel components with respect to each chamber component.

23. The method for manufacturing RPG shield netting according to claim 21, wherein the mesh is a triangular mesh.

24. The method for manufacturing RPG shield netting according to claim 21, wherein the node element comprises one or more materials selected from the group of: a composite material, a high density composite material, a conductive material, a conductive fiber, a conductive powder, a metal fiber, a metal powder, a magnetic powder, a polymeric base resin material.

25. The method for manufacturing RPG shield netting according to claim 21, wherein the node element comprises one or more materials selected from the group of: barium ferrite, strontium ferrite, neodymium iron boron, polyethylene, polypropylene, polyamide, polyphthalamide, and polyphenylene sulfide.

26. The method for manufacturing RPG shield netting according to claim 1, wherein each channel component located less than 90 degrees from the other channel components with respect to each chamber component.

* * * * *